United States Patent
Lindoff et al.

(10) Patent No.: US 9,924,517 B2
(45) Date of Patent: Mar. 20, 2018

(54) RADIO RESOURCE MANAGEMENT MEASUREMENTS IN DENSE NETWORK SCENARIOS

(71) Applicant: Telefonaktiebolaget LM Ericsson (publ), Stockholm (SE)

(72) Inventors: Bengt Lindoff, Bjarred (SE); Joakim Axmon, Kavlinge (SE); Bo Hagerman, Tyreso (SE); Torgny Palenius, Barseback (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 43 days.

(21) Appl. No.: 14/917,937

(22) PCT Filed: Sep. 25, 2013

(86) PCT No.: PCT/EP2013/069931
§ 371 (c)(1),
(2) Date: Mar. 9, 2016

(87) PCT Pub. No.: WO2015/043625
PCT Pub. Date: Apr. 2, 2015

(65) Prior Publication Data
US 2016/0219592 A1 Jul. 28, 2016

(51) Int. Cl.
*H04W 4/00* (2009.01)
*H04W 72/04* (2009.01)
(Continued)

(52) U.S. Cl.
CPC ...... *H04W 72/0453* (2013.01); *H04L 5/0051* (2013.01); *H04W 36/0094* (2013.01); *H04W 64/00* (2013.01)

(58) Field of Classification Search
CPC ........ H04W 72/0453; H04W 36/0094; H04W 64/00; H04L 5/0051
(Continued)

(56) References Cited

U.S. PATENT DOCUMENTS 8,248,997 B2 * 8/2012 Charbit .............. G01S 5/0215
370/328
2009/0318090 A1 * 12/2009 Flordelis ............. H04L 5/0007
455/67.13
(Continued)

FOREIGN PATENT DOCUMENTS

EP 2341647 A1 7/2011
WO 2009095368 A1 8/2009
(Continued)

OTHER PUBLICATIONS

PCT International Search Report, dated Jul. 18, 2014, in connection with International Application No. PCT/EP2013/069931, all pages.
(Continued)

*Primary Examiner* — Peter Cheng
(74) *Attorney, Agent, or Firm* — Leffler Intellectual Property Law, PLLC (57) ABSTRACT

A method of a wireless communication device for operation in a wireless communication network comprising a plurality of cells is disclosed. The method comprises performing radio resource management measurements based on received reference signals of one or more of the cells, wherein the radio resource management measurements are performed over a bandwidth comprising K subcarriers. The method also comprises organizing the K subcarriers into N blocks, wherein each block comprises adjacent subcarriers, performing coherent averaging of the radio resource management measurements over the adjacent subcarriers of each block to produce intermediate measurement results and performing non-coherent averaging of the intermediate mea-
(Continued)

surement results to produce a radio resource management measurement result. The method further comprises detecting whether a condition is fulfilled, wherein the condition is suitable for determining if the wireless communication device is in a dense network scenario, setting N to a first value if the condition is fulfilled and to a second value if the condition is not fulfilled, wherein the first value is lower than the second value. Corresponding arrangement, wireless communication device and computer program product are also disclosed.

14 Claims, 5 Drawing Sheets

(51) Int. Cl.
*H04W 36/00* (2009.01)
*H04L 5/00* (2006.01)
*H04W 64/00* (2009.01)

(58) Field of Classification Search
USPC .................................................... 370/329
See application file for complete search history.

(56) References Cited

U.S. PATENT DOCUMENTS

| | | | |
|---|---|---|---|
| 2013/0170450 A1* | 7/2013 | Anchan | H04W 4/06 370/329 |
| 2014/0038598 A1* | 2/2014 | Ren | H04W 48/16 455/434 |
| 2014/0247821 A1* | 9/2014 | Yamada | H04W 40/125 370/338 |

FOREIGN PATENT DOCUMENTS

| | | |
|---|---|---|
| WO | 2009096837 A1 | 8/2009 |
| WO | 2010062238 A1 | 6/2010 |
| WO | 2012096615 A1 | 7/2012 |

OTHER PUBLICATIONS

PCT Written Opinion, dated Jul. 18, 2014, in connection with International Application No. PCT/EP2013/069931, all pages.

\* cited by examiner

RADIO RESOURCE MANAGEMENT MEASUREMENTS IN DENSE NETWORK SCENARIOS

TECHNICAL FIELD

The present invention relates generally to the field of radio resource management measurements. More particularly, it relates to such measurements in dense network scenarios.

BACKGROUND

Wireless communication systems experience a demand for higher end-user data rates and increased system capacity. Some examples of solutions to increase the system capacity include using existing spectrum resources more efficiently, using additional spectrum resources, increasing the spatial reuse of (existing and/or additional) spectrum (i.e. adding more cells to the system in a denser network node deployment), and various combinations of these three solutions.

For example, extreme system capacity requirements may be a result of a high amount of users demanding a high average data rate, a situation with high traffic density in a geographical area that may typically occur in urban environments. To support such traffic demands, dense or very dense network deployment may be considered.

In dense network node deployment, there typically occur situations when a wireless communication device experiences Line-of-Sight (LoS) conditions in relation to more than one base station (or other network node). LoS conditions may be defined in any conventional way. For example, LoS conditions may refer to a delay spread of the channel from a base station being lower than a LoS threshold and/or a ratio between a peak (e.g. power, energy, magnitude, or similar) and another metric of a channel characteristic being above a ratio threshold, wherein the another metric may comprise an average value or a second largest value or similar among the other values of the channel characteristic (e.g. power delay profile or another suitable delay profile).

A dense network scenario may be defined as a scenario when a wireless communication device experiences LoS conditions (or very close to LoS conditions) in relation to a number of network nodes, wherein the number exceeds a dense network scenario threshold. The dense network scenario threshold may for example be set to a number between 3 and 6, e.g. to 3, 4, 5 or 6, According to another definition, a dense network scenario may be defined as a scenario when a wireless communication device experiences LoS conditions (or very close to LoS conditions) with a received signal strength exceeding a signal strength threshold in relation to a number of network nodes, wherein the number exceeds a dense network scenario threshold. The dense network scenario threshold may, for example, be set as above and the signal strength threshold may, for example, be set to a number between −60 and −80 dBm (for example, for a system with 5 MHz bandwidth and where the received signal strength is measured as a RSSI value), e.g. to −60, −70 or −80 dBm.

In a typical example urban environment with tall or very tall buildings laid out in a Manhattan-type street grid, network nodes (e.g. serving macro cells) may be deployed on roof top level and additional network nodes (e.g. serving micro, pico or femto cells) may be deployed at street level or inside buildings. For example, macro cell nodes may be deployed on roof tops of approximately half of the blocks, and micro cell nodes may be deployed in e.g. each street crossing. In such a dense or very dense deployment, a wireless communication device will often experience LoS conditions in relation to a number of network nodes.

Figure 1:
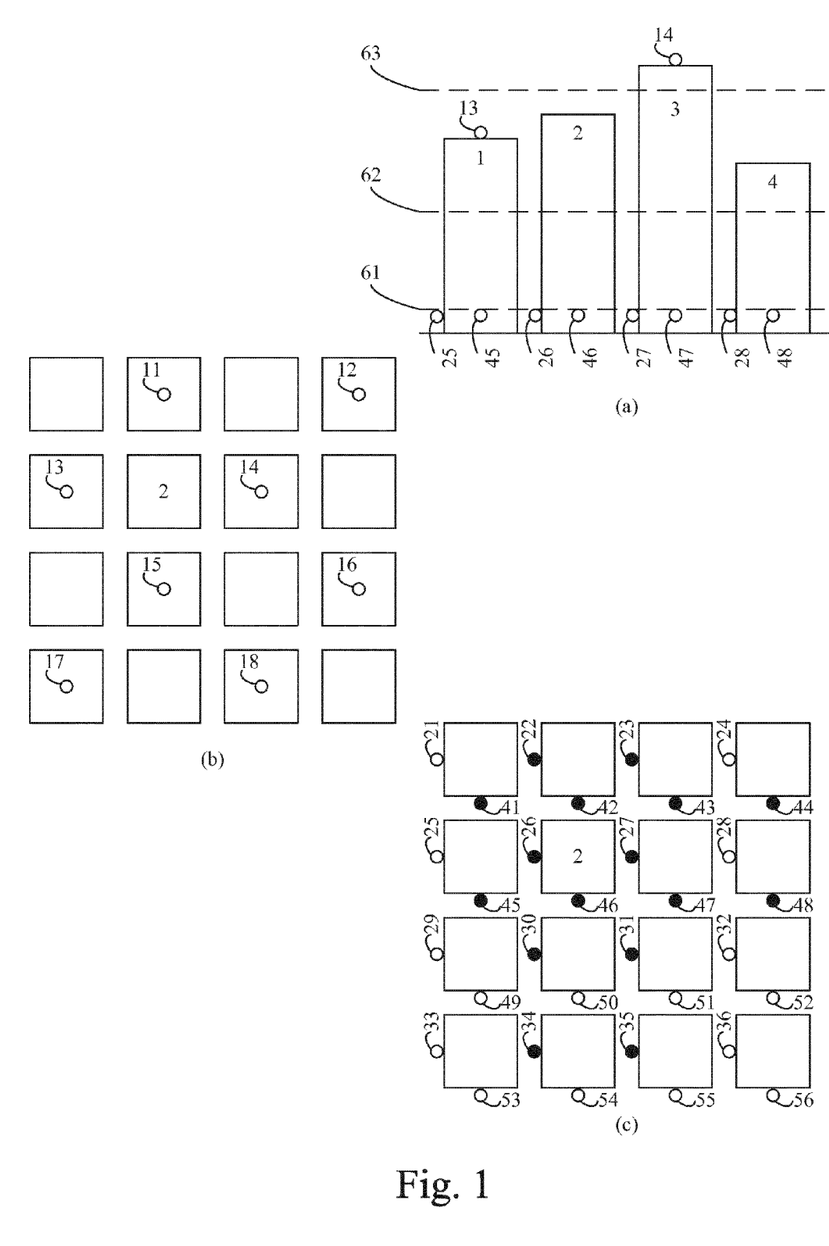
FIG. 1 is a schematic diagram illustrating a dense network scenario according to some embodiments.

For example, FIG. 1 illustrates a dense network scenario in a Manhattan-type street grid according to some embodiments. In part (a) of FIG. 1 a side view of four high-rise buildings 1, 2, 3, 4 is provided. In parts (b) and (c) of FIG. 1 top views of 16 high rise buildings (of which four correspond to the four buildings in part (a)) are provided. Macro cell nodes 11, 12, 13, 14, 15, 16, 17, 18 are deployed on roof tops of some of the buildings as illustrates in part (a) and (b) and micro nodes 21, 22, 23, 24, 25, 26, 27, 28, 29, 30, 31, 32, 33, 34, 35, 36, 41, 42, 43, 44, 45, 46, 47, 48, 49, 50, 51, 52, 53, 54, 55, 56 are deployed on street level on two sides of each building as illustrated in part (a) and (c).

At a high elevation (e.g. a level as illustrated by 63 and by part (b)) the macro cells are dominant and at a low elevation (e.g. a level as illustrated by 61 and by part (c)) the micro cells are dominant. At a medium elevation (e.g. a level as illustrated by 62) the impact of micro and macro cells may be considered similar.

A wireless communication terminal residing in or around building 2 at high elevation may experience LoS conditions to many or all of the macro cell nodes 11-18, and a wireless communication terminal residing in or around building 2 at low elevation may experience LoS conditions to many or all of the micro cell nodes 22, 23, 26, 27, 30, 31, 34, 35, and 41-48 (illustrated by filled circles in part (c) of FIG. 1.

A dense network scenario situation typically offers a challenging radio environment for a wireless communication device to operate in. For example, the isolation between cells near cell borders will be poor and, more generally, a geometry factor describing the difference between the best cell path gain and the sum of the path gain from all other neighboring cells will typically be low.

In a capacity limited situation at full traffic load in an interference limited network, the geometry factor may be equal to a wideband SINR (Signal to Interference and Noise Ratio) before antenna combining at the wireless communication device. However, in contrast to a data-plane SINR measure, the geometry factor is independent of the actual load and interference levels.

For data-plane considerations in dense network scenarios, data communication may be enhanced by transmission and reception coordination methods (e.g. Coordinated Multi Point transmission/reception—CoMP) when a wireless communication device is connected to several cells. Such solutions typically cannot be applied for control-plane considerations, e.g. measurements of Reference Signal Received Power (RSRP) and/or Reference Signal Received Quality (RSRQ) based on Cell-specific Reference Symbols (CRS) to be used by Radio Resource Management (RRM) algorithms. This is due to that CRS and other relevant signaling is always transmitted. Hence, interference problems cannot be solved by coordinated transmission.

RRM measurements are an important functionality of a wireless communication device. It is, for example, used to determine which cell to camp on or connect to. Thus, RRM measurements need to be based on a robust design. A typical robust design of RRM measurements includes considering worst case scenarios of e.g. Doppler spread (channel variation in time domain), delay spread (channel variation in frequency domain) and SINR. However, such a generally robust design limits the performance for some specific scenarios. For example, using a generally robust design in dense network scenarios may lead to the RRM measurements limiting the benefits (e.g. capacity increase) of the dense network deployment, since the generally robust approach does not result in high enough accuracy of the RRM measurements and, hence, the RRM algorithms (e.g. cell selection, handover, etc) becomes sub-optimally executed.

Therefore, there is a need for alternative radio resource measurement approaches in dense network scenarios.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative radio resource measurement approaches in dense network scenarios. According to some embodiments, the approaches may also be able to accommodate other scenarios with similar result as provided by a generally robust approach.

According to a first aspect, a method of a wireless communication device for operation in a wireless communication network comprising a plurality of cells is provided. The method comprises performing radio resource management measurements based on received reference signals of one or more of the cells, wherein the radio resource management measurements are performed over a bandwidth comprising a first number, K, of subcarriers. The method also comprises organizing the first number, K, of subcarriers into a second number, N, of blocks, wherein each block comprises adjacent subcarriers, performing coherent averaging of the radio resource management measurements over the adjacent subcarriers of each block to produce intermediate measurement results and performing non-coherent averaging of the intermediate measurement results to produce a radio resource management measurement result.

The method further comprises detecting whether a condition is fulfilled, wherein the condition is suitable for determining if the wireless communication device is in a dense network scenario, setting the second number, N, to a first value if the condition is fulfilled and setting the second number, N, to a second value if the condition is not fulfilled, wherein the first value is lower than the second value.

For example, each block may comprise a third number, L, of adjacent subcarriers and N times L may equal K.

In some embodiments, the radio resource management measurements may comprise one or more of a reference signal received power (RSRP) and a reference signal received quality (RSRQ). The received reference signals may comprise common reference symbols according to some embodiments.

The condition suitable for determining if the wireless communication device is in a dense network scenario may, according to some embodiments, be an indication of whether or not a combined channel characteristic (based on all applicable base stations) as seen by the wireless communication device is substantially flat in the frequency domain over a range of subcarriers corresponding to the first value.

In some embodiments, detecting whether the condition suitable for determining if the wireless communication device is in the dense network scenario is fulfilled may be based on a geographical location information of the wireless communication device. For example, the condition may be fulfilled if the geographical location is in a dense network deployment area and the condition may be not fulfilled if the geographical location is not in a dense network deployment area. Dense network deployment areas may be defined through a mapping function, look-up-table, database, or any other suitable means matching a geographical location to a corresponding network deployment situation.

For example, the method may comprise determining the geographical location information (e.g. determining a geographical position via a Global Navigation Satellite System—GNSS, such as the Global Positioning system—GPS) and/or receiving the geographical location information from the wireless communication network (e.g. location information based on cell identities of serving/camping cell and/or other detected cells), and basing the condition detection on the geographical location information. A database or any other suitable implementation mapping geographical location information to scenario information may be used to determine whether or not a dense network scenario is applicable at the geographical location. The database may be stored in the wireless communication device or may be downloaded from another storing location (e.g. a network node, a server, the Internet, or a cloud service). Alternatively, the wireless communication device may send a scenario request to the wireless communication network indicating the geographical position information and receive a scenario response from the wireless communication network indicating whether a dense network scenario is applicable at the geographical location.

In some embodiments, detecting whether the condition suitable for determining if the wireless communication device is in the dense network scenario is fulfilled may be based on a measurement configuration received from the wireless communication network. For example, the condition may be fulfilled if the measurement configuration is a first configuration and the condition may be not fulfilled if the measurement configuration is a second configuration.

For example, a restricted measurement pattern configuration may indicate that a dense network scenario is applicable. In some embodiments, detecting whether the wireless communication device is in the dense network scenario may be based on algorithm parameters (e.g. handover threshold values and/or RRM filter constants of layer 3) received from the wireless communication network. For example, a handover trigger threshold value of less than 1 dB difference in signal strength could indicate that a dense network scenario is applicable and/or a layer 3 RRM filter constant of more than 1000 ms could indicate that a dense network scenario is applicable.

In some embodiments, detecting whether the condition suitable for determining if the wireless communication device is in the dense network scenario is fulfilled may be based on a dense network indication signal received from the wireless communication network. For example, the condition may be fulfilled if the dense network indication signal is received and the condition may be not fulfilled if the dense network indication signal is not received. Alternatively, the condition may be fulfilled if the dense network indication signal is received and has a first value and the condition may be not fulfilled if the dense network indication signal is received and has a second value.

In some embodiments, detecting whether the condition suitable for determining if the wireless communication device is in the dense network scenario is fulfilled may be based on cell detection of the wireless communication device.

For example, detecting whether the condition suitable for determining if the wireless communication device is in the dense network scenario is fulfilled may comprise determining if an amount of detected cells exceeds a cell amount threshold. Correspondingly, the number of detected cells exceeding a detected cell threshold may indicate that a dense network scenario is applicable. The condition may be fulfilled if the number of detected cells exceeds the detected cell threshold and the condition may be not fulfilled if the number of detected cells does not exceed the detected cell threshold.

In some embodiments, the condition may be fulfilled if the number of detected cells exceeds the detected cell threshold and a further condition is also fulfilled, and the condition may be not fulfilled if the number of detected cells does not exceed the detected cell threshold. In one example, detecting whether the condition suitable for determining if the wireless communication device is in the dense network scenario is fulfilled may determining if a maximum timing difference between detected cells does not exceed a timing difference threshold. Thus, the number of detected cells exceeding a detected cell threshold may indicate that a dense network scenario is applicable if a maximum timing difference between the detected cells is less than a timing difference threshold.

Various combinations between the above examples are also possible. For example, the geographical position based determination may be performed in response to a restricted measurement pattern configuration having been received, or cell search may be triggered (even if the signal strength of the serving cell is so high that cell search would normally not be performed) if a geographical position indicates that a dense network scenario may be applicable, etc. Thus, the condition may comprise any of the examples given above and/or any other suitable example and/or any combinations thereof.

In some embodiments, the method may further comprise transmitting a report to the wireless communication network based on radio resource management measurement result.

A second aspect is a computer program product comprising a computer readable medium, having thereon a computer program comprising program instructions, the computer program being loadable into a data-processing unit and adapted to cause the data-processing unit to execute method steps according to the first aspect when the computer program is run by the data-processing unit.

A third aspect is an arrangement of a wireless communication device for operation in a wireless communication network comprising a plurality of cells. The arrangement comprises a receiver, a measurement unit, a controller, a coherent averaging unit, a non-coherent averaging unit and a detector.

The receiver is adapted to receive reference signals of one or more of the cells. The measurement unit is adapted to perform radio resource management measurements over a bandwidth comprising a first number, K, of subcarriers based on the received reference signals. The controller is adapted to organize the first number, K, of subcarriers into a second number, N, of blocks, wherein each block comprises adjacent subcarriers.

The coherent averaging unit is adapted to perform coherent averaging of the radio resource management measurements over the adjacent subcarriers of each block to produce intermediate measurement results and the non-coherent averaging unit is adapted to perform non-coherent averaging of the intermediate measurement results to produce a radio resource management measurement result.

The detector is adapted to detect whether a condition is fulfilled, wherein the condition is suitable for determining if the wireless communication device is in a dense network scenario, and the controller is further adapted to set the second number, N, to a first value responsive to the condition being fulfilled and set the second number, N, to a second value responsive to the condition not being fulfilled, wherein the first value is lower than the second value.

The detector may be a dense network scenario detector according to some embodiments.

In some embodiment, the arrangement may further comprise a geographical location unit adapted to achieve a geographical location information of the wireless communication device, and the detector may be adapted to detect whether the condition suitable for determining if the wireless communication device is in the dense network scenario is fulfilled based on the geographical location information.

According to a fourth aspect, a wireless communication device comprising the arrangement according to the third aspect is provided.

In some embodiments, the third and fourth aspects may additionally have features identical with or corresponding to any of the various features as explained above for the first aspect.

Various embodiments may be applicable in systems compliant with the Universal Mobile Telecommunication Standard, Long Term Evolution—UMTS-LTE.

An advantage of some embodiments is that radio resource measurement approaches are provided that perform well in dense network scenarios. Thus, mobility function performance may be improved in dense network scenarios.

Another advantage of some embodiments is that robust performance is achieved in other scenarios.

Yet another advantage of some embodiments is that the spectrum utilization and/or the system capacity may be improved.

BRIEF DESCRIPTION OF THE DRAWINGS

Further objects, features and advantages will appear from the following detailed description of embodiments, with reference being made to the accompanying drawings, in which.

DETAILED DESCRIPTION

The examples herein will refer to an Orthogonal Frequency Division Multiplex (OFDM) system, e.g. UMTS-LTE, for illustrative purposes.

In the following, embodiments will be described where (after detection that a condition is fulfilled, wherein the condition is suitable for determining that a dense network scenario is applicable) the non-coherent averaging span for radio resource management measurements is increased.

Figure 2:
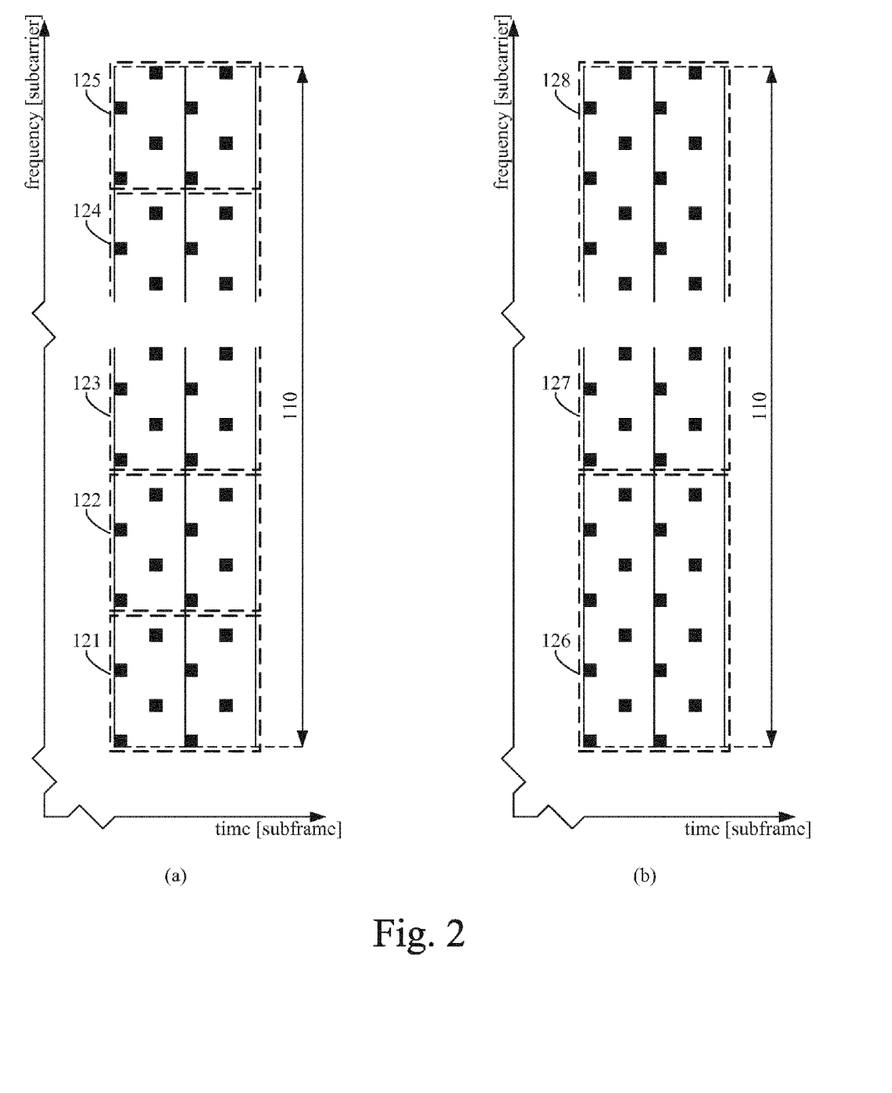
FIG. 2 is a schematic diagram illustrating RRM averaging principles according to some embodiments.

This is illustrated in FIG. 2, where part (a) is a sketch illustrating an example averaging approach for non-dense network scenarios and part (b) is a sketch illustrating a typical averaging approach for a dense network scenario. Each sketch is illustrated in a time-frequency grid where time is shown on the x-axis in terms of subframes and frequency is shown on the y-axis in terms of subcarriers. Black squares illustrate typical common reference symbol (CRS) positions in the grid (LTE, antenna port 0).

Since the radio channel conditions in a dense network scenario will comprise a number of LoS (or nearly LoS) paths from different network nodes, the time dispersion experienced by the wireless communication device will typically be very small and the channel will be close to constant over a large number of resource elements (REs) in the frequency domain. Under these conditions, RRM estimations may beneficially apply an algorithm with low bias (coherent averaging over a large number of subcarriers) which is suitable for low SNR situations. Therefore, a more accurate RRM measurement result may be achieved in dense network scenarios if the non-coherent averaging is performed over a larger number of subcarriers.

In the case illustrated in (a), coherent averaging of measurements (e.g. RSRP based on CRS) collected over a bandwidth K, 110, is performed over each of $N_a$ blocks 121, 122, 123, 124, 125. Thereafter, a non-coherent average (to reduce the variance of the estimate) of the $N_a$ non-coherent average results is calculated. This approach is further explained in US 2009/0318090 A1. In the case illustrated in (b), coherent averaging of measurements (e.g. RSRP and/or RSRQ based on CRS) collected over a bandwidth K, 110, is performed over each of $N_b < N_a$ blocks 126, 127, 128. Thereafter, a non-coherent average of the $N_b$ non-coherent average results is calculated. A typical relation between $N_a$ and $N_b$ may be $N_a/N_b=2$. Typical examples of $N_a$ and $N_b$ may be $L_a=K/8$ and $L_b=K/16$ respectively. In a typical situation, the bias of the resulting estimate is proportional to 1/M while the variance is proportional to 1/(NM), where M is the number of CRS used in the non-coherent averaging.

Coherent averaging over each block followed by non-coherent averaging of the N blocks may, for example, comprise calculation of $$\hat{S} = \frac{1}{N} \sum_{n=1}^{N} \left| \frac{1}{M} \sum_{m=1}^{M} \hat{RS}_m \right|_n^2,$$

where $\hat{RS}_m$ may represent the received signal of CRS symbol m and $\hat{S}$ represents the result of coherent averaging followed by non-coherent averaging. More generally, a coherent average may comprise calculating a weighted sum of the value of each component (e.g. $\sum_{m=1}^{M} w_m X_m$) and a non-coherent average may comprise calculating a weighted sum of the power of each component (e.g. $\sum_{n=1}^{N} w_n |X_n|^2$), where $w_m$ and $w_n$ represent the weights and $X_m$ and $X_n$ represent the respective components to be averaged. Typically, $\sum_{m=1}^{M} w_m=1$ and $\sum_{n=1}^{N} w_n=1$.

In the example illustrated in FIG. 2, coherent accumulation over more than one resource block (RB) pair (12 sub carriers (180 kHz)×14 OFDM symbols (1 ms)) will give erroneous estimates in case of high Doppler and/or large delay spread since there are only 8 CRS per RB pair. Using $M_a=8$ gives a robust RSRP (or RSRQ) estimate suitable for standard scenarios, while $M_b=16$ may be used in dense network scenarios to reduce the bias.

Thus, embodiments of the invention detect when a condition indicative of a dense network scenario being applicable is fulfilled and adjusts the RRM measurement method accordingly.

Figure 3:
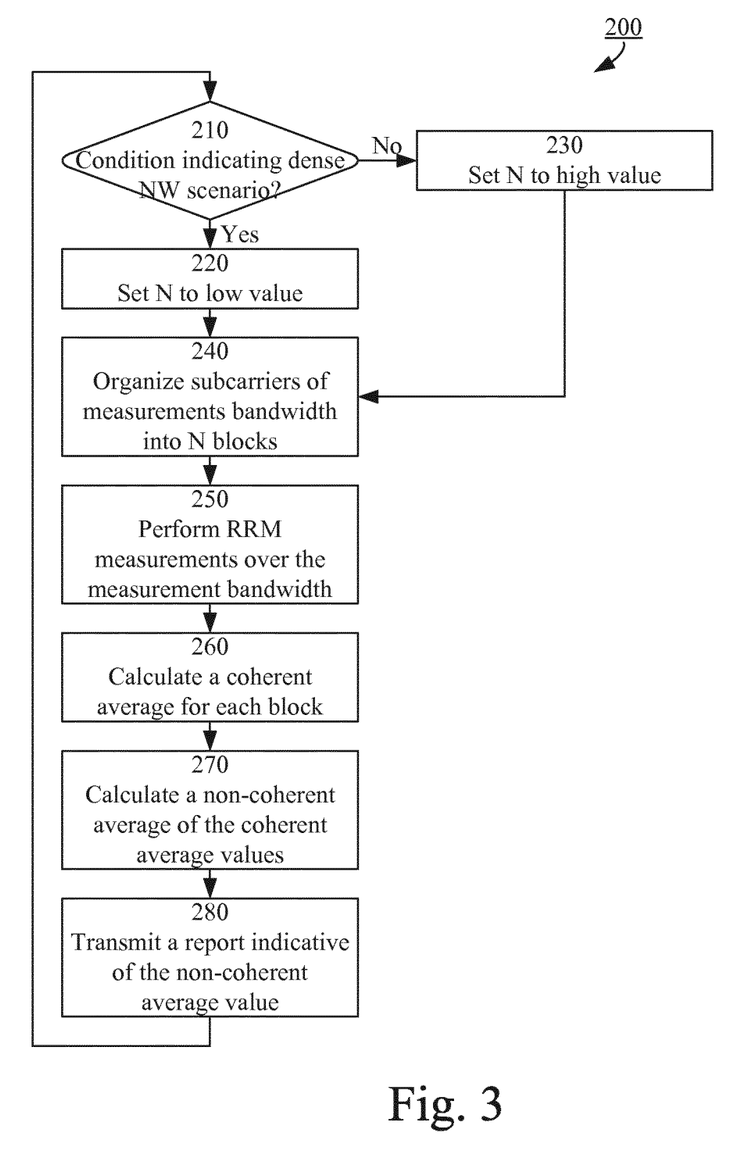
FIG. 3 is a flowchart illustrating example method steps according to some embodiments.

FIG. 3 illustrate an example method 200 for a wireless communication device camping on a cell provided by a network node in a wireless communication network comprising a plurality of cells.

The method starts in step 210 where it is detected whether the condition suitable for determining if the wireless communication device is in a dense network scenario is fulfilled. If the detection indicates that the condition is fulfilled (thus, that the wireless communication device is in a dense network scenario) (Yes-path out of step 210) a number, N, is set to a first value in step 220 and if the detection indicates that the condition is not fulfilled (No-path out of step 210) a number, N, is set to a second value in step 230. The first value is a low value that is lower than the second value which is a high value.

In step 240, a first number, K (typically corresponding to a measurement bandwidth), of subcarriers are organized into a second number, N, of blocks, wherein each block comprises adjacent subcarriers, and radio resource management measurements are performed in step 250 over a measurement bandwidth based on received reference signals of one or more of the cells. For example, each block may comprise a third number, L, of adjacent subcarriers, and N times L may equal K. Steps 240 and 250 may alternatively be performed in parallel or in reversed order.

Coherent averaging of the radio resource management measurements over the adjacent subcarriers of each block is performed in step 260 to produce intermediate measurement results, and non-coherent averaging of the intermediate measurement results is performed in step 270 to produce a radio resource management measurement result. Steps 230, 240, 260, 270 may be compared with FIG. 2(a) and steps 220, 240, 260, 270 may be compared with FIG. 2(b).

The radio resource management measurement result is then used for RRM procedures, e.g. cell selection by the wireless communication device and/or transmission of a report based on the radio resource management measurement result (i.e. indicative of the non-coherent average value) to the wireless communication network (step 280).

The RRM measurements of step 250 (e.g. RSRP or RSRQ=RSRP/RSSI, where RSSI is a received signal strength indication) may be performed on a regular basis, e.g. with a regularity according to a standard such as the 3GPP UMTS LTE standard and based on an activity state (e.g. idle or active). Alternatively, the regularity of the measurements may be configured by the network node that the wireless communication device is currently camping on or connected to. For example, one measurement snap shot may be taken every paging cycle in idle mode (in a discontinuous reception—DRX—manner) and averaged over a number of paging cycles (e.g. 2-4 paging cycles).

Figure 4:
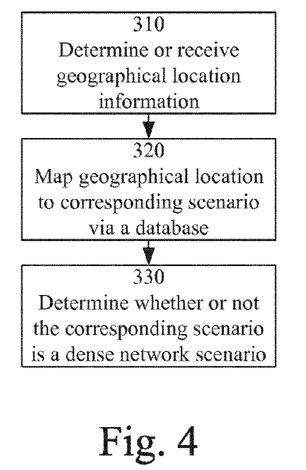
FIG. 4 is a flowchart illustrating example method steps according to some embodiments.
Figure 5:
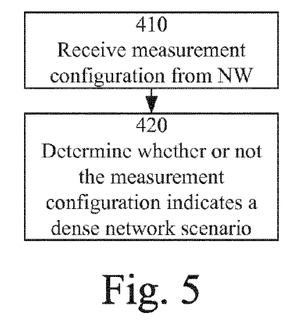
FIG. 5 is a flowchart illustrating example method steps according to some embodiments.
Figure 6:
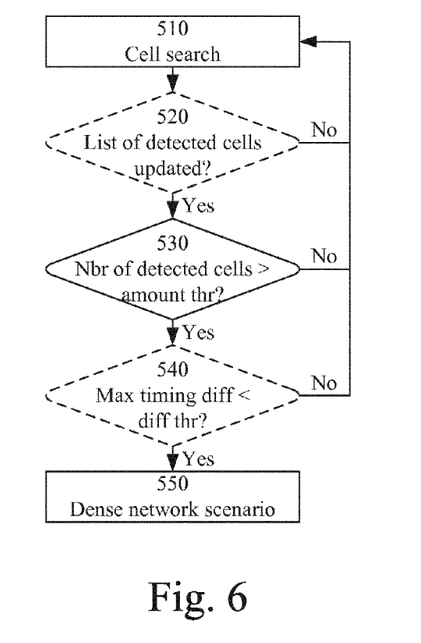
FIG. 6 is a flowchart illustrating example method steps according to some embodiments.

FIGS. 4, 5 and 6 illustrate different examples of how the detection of step 210 may be implemented.

In FIG. 4, detecting whether the condition suitable for determining if the wireless communication device is in the dense network scenario is fulfilled is based on a geographical location information of the wireless communication device.

A geographical location information (e.g. positioning information) may be determined by the wireless communication device or received from the wireless communication network, e.g. based on cell identity and network node location information (or achieved in any other suitable way) as illustrated in step 310. Step 310 may, for example, be performed at regular time intervals and/or triggered by a handover/cell re-selection.

In step 320, the geographical location is mapped to a corresponding scenario via a mapping database including dense network deployment areas, and the determination of whether the condition is fulfilled is made accordingly in step 330.

In FIG. 5, a measurement configuration received in a message from the wireless communication network in step 410 and detecting whether the condition suitable for determining if the wireless communication device is in the dense network scenario is fulfilled is based on the measurement configuration in step 420. The configuration message received in step 410 may be a radio resource control (RRC) message. It may, for example, be received during handover and/or during connection setup, and it may be received via a broadcast channel (e.g. in a System Information Block— SIB).

Detection may alternatively or additionally be based on other types of configuration information from the network. General examples of indicators of a dense network scenario that may be received from the network include explicit information regarding dense network deployment in the current area or region, a restricted measurement pattern configuration, values of handover thresholds, and RRM Layer 3 filter constants. Alternatively or additionally, the network may signal explicitly that a dense network deployment is applicable.

In FIG. 6, detecting whether the condition suitable for determining if the wireless communication device is in the dense network scenario is fulfilled is based on cell detection of the wireless communication device. Cell search is performed in step 510, either according to standard triggers or according to a particular trigger (e.g. based on any of the methods of FIGS. 4 and 5) that a dense network scenario is suspected. For example, the device may perform cell search on a regular basis (e.g. during 5 ms every 40 ms, or every DRX cycle if configured by the network). Each time a cell is detected by the cell search or removed since synchronization is lost; a list of detected cells is updated.

In an optional step 520, it is checked whether or not the list of detected cells were updated during the cell search. If not (No-path out of step 520), the method returns to step 510 (where it is determined that a dense network scenario is not applicable) and waits for the next cell search activation.

If the detected cells were updated during the cell search (Yes-path out of step 520) the method determines in step 530 whether or not the number of detected cells (i.e. the size of the list) is larger than an amount threshold. For example, the amount threshold may be equal to 3 or 4, In some embodiments, the method proceeds directly to step 530 after execution of step 510.

If the number of detected cells is not larger than the amount threshold (No-path out of step 530), the method returns to step 510 (where it is determined that a dense network scenario is not applicable) and waits for the next cell search activation. If the number of detected cells is larger than the amount threshold (Yes-path out of step 530), the method may proceed to an optional step 540 or directly to step 550.

In the optional step 540, it is determined if the maximum timing difference experienced between dells of the detected cell list is below a difference threshold (typically indicating many LoS cells). If the maximum timing difference is not below the difference threshold (No-path out of step 530), the method returns to step 510 (where it is determined that a dense network scenario is not applicable) and waits for the next cell search activation. If the maximum timing difference is below the difference threshold (Yes-path out of step 530), the method proceeds to step 550, where it is determined that a dense network scenario is applicable.

Other metrics related to the timing difference between cells than the maximum timing difference may be applied in step 540. For example, an average timing difference may be used. Timing difference measures are typically related to the distance to each cell in synchronous networks. In one example, the timing advance in the serving cell may be used as an alternative, initial or additional indicator of a dense network scenario. That is, if the timing advance is low (small cell radius) a dense network deployment may be assumed.

Yet alternatively or additionally, relative received signal levels of the detected cells may be used as a dense network scenario indication. For dense network deployments the received signal levels from neighboring cells will differ less than in other scenarios due to e.g. smaller cell radii.

Thus, detecting whether the condition suitable for determining if the wireless communication device is in the dense network scenario is fulfilled may comprise determining if an amount of detected cells exceeds a cell amount threshold (No-path out of step 530) according to some embodiments. Furthermore, detecting whether the condition suitable for determining if the wireless communication device is in the dense network scenario is fulfilled may comprise determining if a maximum timing difference between detected cells does not exceed a timing difference threshold (Yes-path out of step 540) according to some embodiments.

Figure 7:
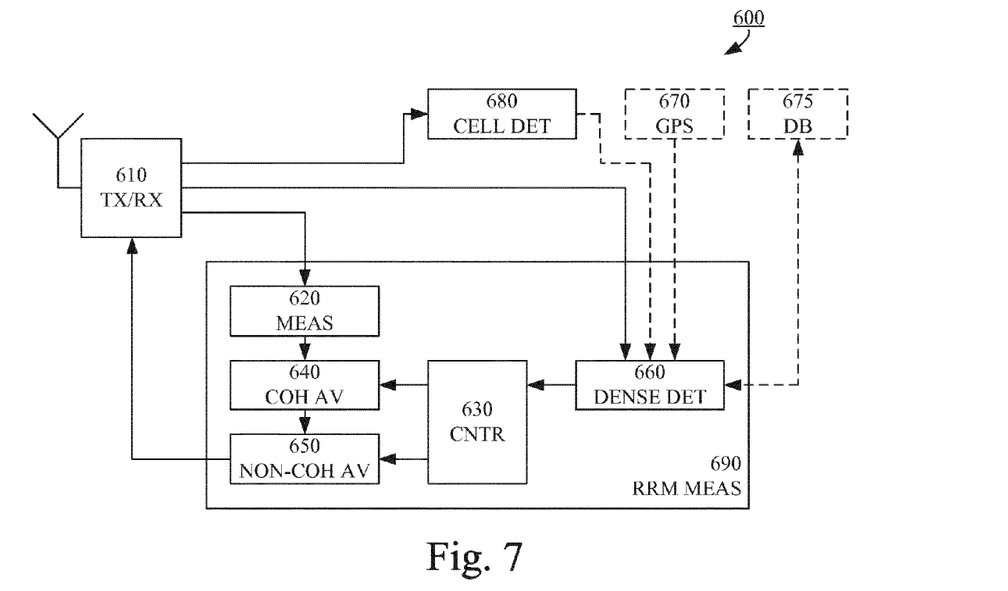
FIG. 7 is a block diagram illustrating an example arrangement according to some embodiments.

FIG. 7 illustrates an example arrangement 600. The arrangement 600 may, for example, be adapted to perform any of the methods as illustrated in FIGS. 3-6 and may be comprised in a wireless communication device for operation in a wireless communication network comprising a plurality of cells.

The arrangement 600 comprises a receiver and a transmitter (implemented as a transceiver (TX/RX) 610 in this example), a measurement unit (MEAS) 620, a controller (CNTR) 630, a coherent averaging unit (COH AV) 640, a non-coherent averaging unit (NON-COH AV) 650, and a detector such as a dense network scenario detector (DENSE DET) 660. The measurement unit 620, the controller 630, the coherent averaging unit 640, the non-coherent averaging unit 650, and the dense network scenario detector 660 may be comprised in a radio resource measurement unit (RRM MEAS) 690.

The receiver is adapted to receive reference signals of one or more of the cells and the measurement unit is adapted to perform radio resource management measurements over a bandwidth comprising a first number, K, of subcarriers based on the received reference signals (compare with step 250 of FIG. 3).

The controller is adapted to organize the first number, K, of subcarriers into a second number, N, of blocks, wherein each block comprises adjacent subcarriers (compare with step 240 of FIG. 3), the coherent averaging unit is adapted to perform coherent averaging of the radio resource management measurements over the adjacent subcarriers of each block to produce intermediate measurement results (compare with step 260 of FIG. 3) and the non-coherent averaging unit is adapted to perform non-coherent averaging of the intermediate measurement results to produce a radio resource management measurement result (compare with step 270 of FIG. 3).

The transmitter 610 may be adapted to transmit a report to the wireless communication network based on radio resource management measurement result.

The dense network scenario detector is adapted to detect whether the condition suitable for determining if the wireless communication device is in a dense network scenario is fulfilled (compare with step 210 of FIG. 3) and the controller is further adapted to set the second number, N, to a first (low) value responsive to the dense network scenario detector indicating that the condition is fulfilled and to set the second number, N, to a second (high) value responsive to the dense network scenario detector indicating that the condition is not fulfilled, wherein the first value is lower than the second value (compare with steps 220 and 230 of FIG. 3).

The arrangement 600 may further comprise means (e.g. a geographical location unit (GPS) 670 or receiver 610) adapted to achieve a geographical location information of the wireless communication device and possibly a database (DB) 675 mapping location information to scenario information. In such cases, the dense network scenario detector 660 may be adapted to detect whether the condition suitable for determining if the wireless communication device is in the dense network scenario is fulfilled based on the geographical location information (compare with FIG. 4).

In some examples, the receiver 610 may further adapted to receive a measurement configuration from the wireless communication network. In such cases, the dense network scenario detector 660 may adapted to detect whether the condition suitable for determining if the wireless communication device is in the dense network scenario is fulfilled based on the measurement configuration (compare with FIG. 5).

The arrangement 600 may further comprise a cell detector (CELL DET) 680 adapted to detect one or more of the cells. In such cases, the dense network scenario detector 660 may be adapted to detect whether the condition suitable for determining if the wireless communication device is in the dense network scenario is fulfilled based on the detected cells (compare with FIG. 6).

According to some embodiments it is detected when a condition indicative of when a dense network scenario is experienced is fulfilled and a conventional RRM measurement method is adapted accordingly to achieve acceptable performance in dense network scenarios. Typically, better mobility function and better cell selection is achieved, and thereby better spectrum utilization and capacity.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, a USB-stick, a plug-in card, an embedded drive, or a mobile gaming device.

Figure 8:
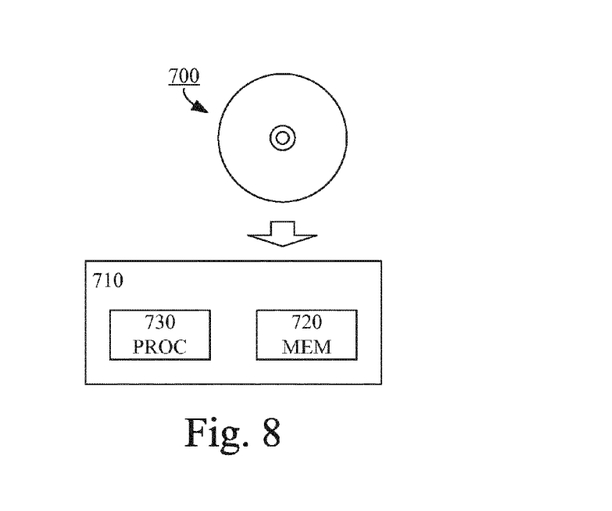
FIG. 8 is a schematic drawing illustrating a computer readable medium according to some embodiments.

According to some embodiments, a computer program product comprises a computer readable medium such as, for example, a diskette or a CD-ROM 700 as illustrated in FIG. 8. The computer readable medium may have stored thereon a computer program comprising program instructions. The computer program may be loadable into a data-processing unit (730), which may, for example, be comprised in a wireless communication device such as a mobile terminal (710). When loaded into the data-processing unit, the computer program may be stored in a memory (720) associated with or integral to the data-processing unit. According to some embodiments, the computer program may, when loaded into and run by the data-processing unit, cause the data-processing unit to execute method steps according to, for example, the methods shown in any of the FIGS. 3-6.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a wireless communication device for operation in a wireless communication network comprising a plurality of cells provided by a plurality of network nodes, the method comprising:
   detecting whether a condition is fulfilled indicating that the wireless communication device is in a dense network scenario, wherein the dense network scenario includes:
      a scenario in which the wireless communication device experiences line-of-sight conditions in relation to a number of network nodes; or
      a scenario in which the wireless communication device experiences line-of-sight conditions with a received signal strength exceeding a signal strength threshold in relation to the number of network nodes,
   wherein the number of network nodes exceeds a dense network scenario threshold;
   setting a second number, N, to a first value if the detection indicates that the condition is fulfilled;
   setting the second number, N, to a second value if the detection indicates that the condition is not fulfilled, wherein the first value is lower than the second value;
   performing radio resource management measurements of at least one of quality and power of received reference signals of one or more of the cells, wherein the radio resource management measurements are performed over a bandwidth comprising a first number, K, of subcarriers;

organizing the first number, K, of subcarriers into the second number, N, of blocks, wherein each block comprises adjacent subcarriers;

performing coherent averaging of the radio resource management measurements over the adjacent subcarriers of each block to produce intermediate measurement results representing a weighted sum of the radio resource management measurements over the adjacent subcarriers of each block; and performing non-coherent averaging of the intermediate measurement results to produce a radio resource management measurement result representing a weighted sum of the powers of the intermediate measurement results produced over the N blocks.

2. The method of claim 1 wherein detecting whether the condition indicating that the wireless communication device is in the dense network scenario is fulfilled is based on a geographical location information of the wireless communication device.

3. The method of claim 1 wherein detecting whether the condition indicating that the wireless communication device is in the dense network scenario is fulfilled is based on a measurement configuration received from the wireless communication network.

4. The method of claim 1 wherein detecting whether the condition indicating that the wireless communication device is in the dense network scenario is fulfilled is based on cell detection of the wireless communication device.

5. The method of claim 4 wherein detecting whether the condition indicating that the wireless communication device is in the dense network scenario is fulfilled comprises determining if an amount of detected cells exceeds a cell amount threshold.

6. The method of claim 5 wherein detecting whether the condition indicating that the wireless communication device is in the dense network scenario is fulfilled comprises determining if a maximum timing difference between detected cells does not exceed a timing difference threshold.

7. The method of claim 1, further comprising transmitting a report to the wireless communication network based on the non-coherent average value radio resource management measurement result.

8. The method of claim 1, wherein each block comprises a third number, L, of adjacent subcarriers and N times L equals K.

9. A nontransitory computer readable medium having thereon a computer program comprising program instructions, the computer program being loadable into a data-processing unit and adapted to cause execution of a method when the computer program is run by the data-processing unit, wherein the method is of a wireless communication device for operation in a wireless communication network comprising a plurality of cells provided by a plurality of network nodes, and wherein the method comprises:

detecting whether a condition is fulfilled indicating that the wireless communication device is in a dense network scenario, wherein the dense network scenario includes:
a scenario in which the wireless communication device experiences line-of-sight conditions in relation to a number of network nodes; or
a scenario in which the wireless communication device experiences line-of-sight conditions with a received signal strength exceeding a signal strength threshold in relation to the number of network nodes,
wherein the number of network nodes exceeds a dense network scenario threshold;

setting a second number, N, to a first value if the detection indicates that the condition is fulfilled, setting the second number, N, to a second value if the detection indicates that the condition is not fulfilled, wherein the first value is lower than the second value;

performing radio resource management measurements of at least one of quality and power of received reference signals of one or more of the cells, wherein the radio resource management measurements are performed over a bandwidth comprising a first number, K, of subcarriers;

organizing the first number, K, of subcarriers into the second number, N, of blocks, wherein each block comprises adjacent subcarriers;

performing coherent averaging of the radio resource management measurements over the adjacent subcarriers of each block to produce intermediate measurement results representing a weighted sum of the radio resource management measurements over the adjacent subcarriers of each block; and performing non-coherent averaging of the intermediate measurement results to produce a radio resource management measurement result representing a weighted sum of the powers of the intermediate measurement results produced over the N blocks.

10. A wireless communication device for operation in a wireless communication network comprising a plurality of cells provided by a plurality of network nodes, the wireless communication device comprising:

a detector adapted to detect whether a condition is fulfilled indicating that the wireless communication device is in a dense network scenario, wherein the dense network scenario includes:
a scenario in which the wireless communication device experiences line-of-sight conditions in relation to a number of network nodes; or
a scenario in which the wireless communication device experiences line-of-sight conditions with a received signal strength exceeding a signal strength threshold in relation to the number of network nodes,
wherein the number of network nodes exceeds a dense network scenario threshold;

a controller adapted to:
set a second number, N, to a first value responsive to the condition being fulfilled; and
set the second number, N, to a second value responsive to the condition not being fulfilled, wherein the first value is lower than the second value;

a receiver adapted to receive reference signals of one or more of the cells;

a measurement unit adapted to perform radio resource management measurements of at least one of quality and power of the received reference signals over a bandwidth comprising a first number, K, of subcarriers, wherein the controller is further adapted to organize the first number, K, of subcarriers into the second number, N, of blocks, wherein each block comprises adjacent subcarriers;

a coherent averaging unit adapted to perform coherent averaging of the radio resource management measurements over the adjacent subcarriers of each block to produce intermediate measurement results representing a weighted sum of the radio resource management measurements over the adjacent subcarriers of each block; and a non-coherent averaging unit adapted to perform non-coherent averaging of the intermediate measurement results to produce a radio resource management measurement result representing a weighted sum of the powers of the intermediate measurement results produced over the N blocks.

11. The wireless communication device of claim 10 further comprising a geographical location unit adapted to achieve a geographical location information of the wireless communication device, and wherein the detector is adapted to detect whether the condition indicating that the wireless communication device is in the dense network scenario is fulfilled based on the geographical location information.

12. The wireless communication device claim 10 wherein the receiver is further adapted to receive a measurement configuration from the wireless communication network, and wherein the detector is adapted to detect whether the condition indicating that the wireless communication device is in the dense network scenario is fulfilled based on the measurement configuration.

13. The wireless communication device of claim 10 further comprising a cell detector adapted to detect one or more of the cells, and wherein the detector is adapted to detect whether the condition indicating that the wireless communication device is in the dense network scenario is fulfilled based on the detected cells.

14. The wireless communication device of claim 10, further comprising a transmitter adapted to transmit a report to the wireless communication network based on the radio resource management measurement result.

* * * * *